No. 666,864.  
E. HEIRMAN.  
VARIABLE SPEED GEAR.  
(Application filed Aug. 18, 1900.)  
Patented Jan. 29, 1901.

(No Model.)

WITNESSES:  
Ella L. Giles  
Otto Munk

INVENTOR  
Edmond Heirman  
BY  
Richardson  
ATTORNEYS

THE NORRIS PETERS CO., PHOTO-LITHO., WASHINGTON, D. C.

UNITED STATES PATENT OFFICE.

EDMOND HEIRMAN, OF MONT-SUR-MARCHIENNE, BELGIUM.

VARIABLE-SPEED GEAR.

SPECIFICATION forming part of Letters Patent No. 666,864, dated January 29, 1901.

Application filed August 18, 1900. Serial No. 27,296. (No model.)

*To all whom it may concern:*

Be it known that I, EDMOND HEIRMAN, engineer, a subject of the King of Belgium, and a resident of Mont-sur-Marchienne, Belgium, have invented certain new and useful Improvements in Variable-Speed Gear for Motor-Cars and other Purposes, of which the following is a specification.

The object of this invention is an improvement in gearing for changing the speed of motor-cars or other self-propelled vehicles. It will be described with reference to the accompanying drawings.

Figure 2:
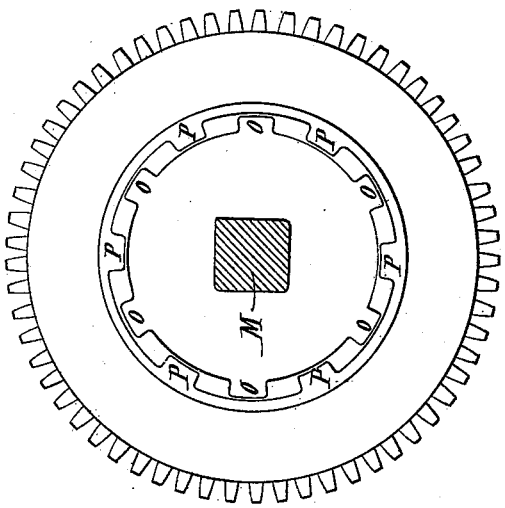
Figure 1:
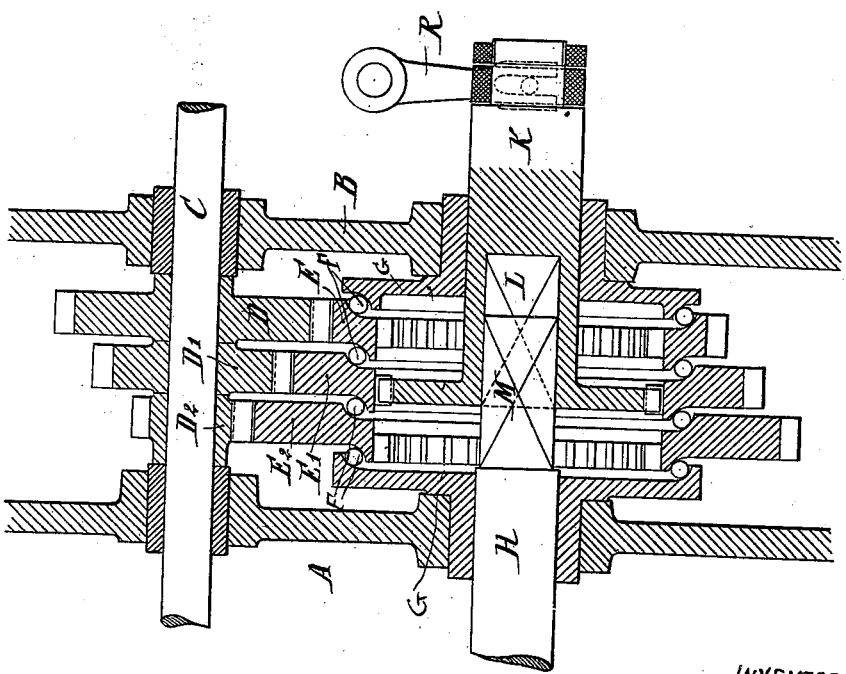

Figure 1 is a transverse section of the apparatus. Fig. 2 is a detail view of the toothed disk and of one of the toothed wheel-rims.

Suitable bearings arranged in the frame of the machine A and B carry a driving-shaft C, coupled direct to the motor or receiving its motion in any other suitable way. On this shaft are keyed toothed wheels D D' D², varying in number according to the number of variations of speed desired. These toothed wheels gear with an equal number of toothed wheel-rims E E' E², between which balls F are arranged to support and keep them central between two guide-plates G G', carried by the frame of the motor. The centers of these guide-plates are bored to form a bearing for the driving-shaft H of the motor and a sleeve K on the end of it. This sleeve K has a hole L in its end of polygonal shape and preferably square, which can slide over a similar-shaped part M of the driving-shaft H of the same section. The sleeve K carries a disk N, provided with projections O. When the sleeve K is moved along the shaft by means of a lever R or in any other suitable way, the projections O of the disk N are brought opposite to the projections P on one or other of the toothed wheel-rims and the disk is revolved at a speed varying according to the toothed wheel-rim with which it is in gear. The driving-shaft H will therefore be carried around at the same speed. It is this which gives motion to the axles of the carriage, or to the differential gear, or to any other part, whether connected or not with an autocar.

The advantages to be gained by the use of this invention are that the toothed wheels for varying the speed are concentric, while they at the same time allow of the use of a disk of comparatively large diameter provided with teeth or projections having between the teeth sufficient play for successive connections to be made without shock.

Having now particularly described and ascertained the nature of the said invention and in what manner the same is to be performed, I declare that what I claim is—

In combination, the driving-shaft carrying a plurality of gears of varying size, a driven shaft parallel therewith and having an end of angular cross-section, a shaft axially in line with said driven shaft and having a hollow end corresponding to and engaging said angular end, a disk carried by said hollow end having a toothed periphery, a plurality of gear-rings encircling said shafts and meshing with the gears on said driving-shaft, said gear-rings having internal teeth for engaging the teeth of said disk, and means for moving said hollow-end shaft longitudinally, substantially as described.

In witness whereof I have hereunto set my hand in presence of two witnesses.

EDMOND HEIRMAN.

Witnesses:
 ED. THIRIOMES,
 GREGORY PHELAN.